Patented Aug. 4, 1936

2,050,203

UNITED STATES PATENT OFFICE 2,050,203

ACCELERATOR OF VULCANIZATION

Jan Teppema, Cuyahoga Falls, Ohio, assignor to Wingfoot Corporation, Wilmington, Del., a corporation of Delaware No Drawing. Application July 7, 1934,
Serial No. 734,232

23 Claims. (Cl. 18—53)

This invention relates to a class of novel reaction products the members of which, either alone or in conjunction with other substances, are useful as accelerators of the vulcanization of rubber. It relates, among other things, to a method of accelerating the processes of vulcanization by incorporating in the unvulcanized stock certain novel reaction products of the kind herein disclosed which not only are comparatively easy to prepare but also serve to impart desirable physical properties to the vulcanized product. The class of compounds in question are the reaction products of mercaptazoles, such as mercaptothiazoles and mercaptoxazoles, formaldehyde and an ammonium sulphide such as ammonium hydrogen sulphide, ($NH_4HS$) and ammonium sulphide ($(NH_4)_2S$). The exact constitution of these reaction products is as yet not definitely known, consequently, they will be referred to herein as reaction products.

In the preparation of these reaction products a number of variations of procedure are possible. Thus, formaldehyde and the desired ammonium sulphide may be first reacted and this reaction product reacted with the mercaptazole. Also, the ammonium sulphide may be reacted with the mercaptan and this reaction product reacted with formaldehyde. Another procedure is to first react the mercaptan and formaldehyde and then treat this reaction product with the ammonium sulphide desired. A still further procedure is to react all three reactants at once.

If a reaction product of formaldehyde and the ammonium sulphide is to be prepared first, it is obtained by simply reacting the two materials. Since the reaction is exothermic, it is generally preferable to react the materials in the cold. One method which has been found particularly suitable is that in which 1000 parts by weight of an approximately 40% solution of ammonium hydrogen sulphide, cooled with approximately 600 parts of ice, are mixed with 1620 parts by weight of an aqueous 37% formaldehyde solution. An exothermic reaction takes place with the separation of a white gummy mass which gradually resinifies. This material, after being permitted to stand for some time, is ground to a fine powder, washed with water and dried. The reaction product may then be reacted with a mercaptazole as will be described hereinafter. It is to be understood that it is not necessary to first grind the reaction product, wash it and dry it before its further reaction with the mercaptazole.

In the above example, the formaldehyde and ammonium hydrogen sulphide are reacted in the proportion of five mols of aldehyde to two mols of the sulphide. Although its exact constitution is not known, this particular product has been referred to in the 4th Edition of Beilstein, Vol. I, page 563 as "penta methylene diamino disulphide". The following equation has been suggested for its formation:

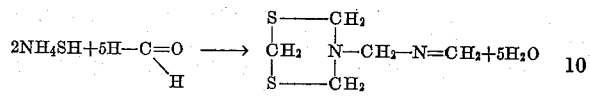

It will be understood that despite the fact that a name and formula have been assigned this reaction product, there is doubt as to its constitution.

While the reaction product of "penta methylene diamino disulphide" and mercaptazoles have been found to be very effective accelerators, it is to be understood that formaldehyde and ammonia hydrogen sulphide may be reacted in substantially any other proportions. Likewise other ammonium sulphides such as ammonium sulphide ($(NH_4)_2S$), may be employed in place of, or in admixture with, the ammonium hydrogen sulphide.

Example 1

Illustrative of the invention, 32 parts by weight of 1-mercaptobenzothiazole, 32 parts of the "penta methylene diamino disulphide" described above and 150 grams of toluol are heated under reflux. At first a clear solution is obtained, but as the reaction proceeds the reaction product becomes insoluble. After heating under reflux for a period of four hours, the insoluble material is filtered off and extracted with 3% aqueous ammonia at a temperature in the neighborhood of the boiling point in order to remove any unreacted 1-mercaptobenzothiazole. It will be found that the reaction proceeds almost to completion as two successive extractions yield after acidification only 1.5 parts of unreacted 1-mercaptobenzothiazole. The reaction product is a grayish white material which melts in the neighborhood of 193–195 degrees C. While the exact formula of this reaction product is not known, it has been suggested that the following equation represents the reaction:

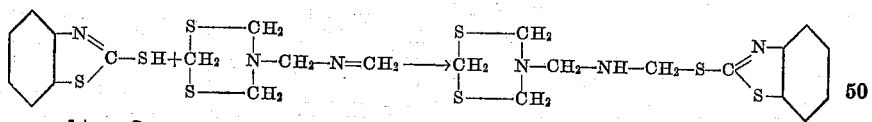

Example 2

Alternatively, the reaction product described in Example 1 may be prepared simply by fusing the "penta methylene diamino disulphide" and the 1-mercaptobenzothiazole, thus eliminating solvents entirely. In such case 147 grams of the "penta methylene diamino disulphide" are heated to 120 degrees C. Gradually 152 grams of 1-mercaptobenzothiazole are added thereto. The mass becomes stiffer with the addition of the mercaptobenzothiazole and the temperature is correspondingly raised to 170 degrees C. and finally to 195 degrees C. The reaction is most violent at approximately 180 degrees C. The product is extracted three times with 3% boiling ammonia whereupon 260 parts of reaction product remain.

Example 3

Further illustrative of the invention, 83.5 parts of 1-mercaptobenzothiazole are added to 116 parts of an aqueous solution of approximately 44% ammonium hydrogen sulphide. 244 parts of a 37% aqueous formaldehyde solution are added slowly, meanwhile agitating the mass vigorously and keeping the temperature at approximately 25 degrees C. The mass is then allowed to stand for 16 hours after which it is heated in boiling water. At approximately 80 degrees C. the product is gummy, but on raising the temperature to boiling a white hard product is formed. The product after being extracted with boiling ammonia, melts in the neighborhood of 188–190 degrees C. and is obtained in a yield of 95 parts.

Example 4

In another variation of the procedure of reacting a mercaptazole, formaldehyde and an ammonium sulphide, 132 parts of a 38.8% aqueous ammonium hydrogen sulphide solution, 50 parts of 25% aqueous ammonia, 83.5 parts of 1-mercaptobenzothiazole and 200 parts of ice are admixed. To this mixture is added slowly, with stirring, 250 parts of a 37% aqueous formaldehyde solution. After all the formaldehyde is added, the temperature is raised to the boiling point. A white reaction product is obtained, after which grinding and washing with 3% boiling ammonia, is obtained in a yield of 114 parts, melting in the neighborhood of 181–184 degrees C.

Example 5

In still another example of the invention 334 parts of 1-mercaptobenzothiazole are dissolved in a solution of 90 parts of caustic soda in 1000 parts of water and to this solution are added 170 parts of 37% aqueous formaldehyde solution. The mass is allowed to stand for one hour at 25–30 degrees C. after which the solution is filtered and acidified with a 10% aqueous sulphuric acid solution. A precipitate, consisting essentially of benzothiazyl methylene hydrin,

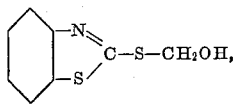

forms, and is filtered and washed with water. To the wet cake of the benzothiazyl methylene hydrin are added 522 parts of a 39.5% aqueous ammonium hydrogen sulphide solution, 1200 parts of ice and 660 parts of a 37% aqueous formaldehyde solution. The mass is allowed to stand for 12 hours, meanwhile being agitated, and is then boiled for a period of approximately one hour. A white reaction product, which after being cooled, ground and washed with 2000 parts of a 3% NaOH solution at 25 degrees C., is obtained in a yield of 560 parts and melts in the neighborhood of 195–198 degrees C. 32 parts of unreacted 1-mercaptobenzothiazole are recovered after washing with the NaOH solution.

It will be understood that the benzothiazyl methylene hydrin may be prepared by other methods, such as, for example, by suspending 1-mercaptobenzothiazole in alcohol and adding formaldehyde. The benzothiazyl methylene hydrin is very soluble in alcohol and can be obtained in a pure form by crystallization.

It will be noted that the products obtained in Examples 1 to 5, inclusive, have slightly different melting points although the reacting materials are the same. These differences are caused by small amounts of impurities which vary according to the method of preparation employed. By dissolving any of the products of Examples 1 to 5 in nitro benzene and in symmetrical glyceryl-dichlor-hydrin and crystallizing them they can be obtained in a substantially pure state melting at 223–224 degrees C.

Example 6

Illustrative of a reaction product employing ammonium sulphide $(NH_4)_2S$, 168 parts of 1-mercaptobenzothiazole are added to 256 parts of a 36% aqueous solution of ammonium sulphide and 400 parts of ice. To this mixture 492 parts of a 37% aqueous formaldehyde solution are added slowly with agitation. The mixture is allowed to stand for approximately one hour at a temperature not above 25 degrees C. after which the mass is heated to 100 degrees C. A cream colored reaction product formed which, after being freed from unreacted 1-mercaptobenzothiazole by extraction with a 2% aqueous sodium hydroxide solution at 80 degrees C. is obtained in a yield of 243 grams. The reaction product melts at 120–122 degrees C.

Example 7

The reaction product of 4-chlor 1-mercaptobenzothiazole, formaldehyde and ammonium hydrogen sulphide may conveniently be prepared by adding 64 parts by weight of 4-chlor 1-mercaptobenzothiazole to 200 parts of ice, 19 parts of 28% aqueous ammonia and 64 parts of 39.5% aqueous $NH_4SH$ solution. The mixture is agitated and 123 parts of 37% aqueous formaldehyde solution are added slowly thereto. The mass is heated to the boiling point for approximately 15 minutes whereupon a white reaction product forms. This reaction product, after being extracted with 500 parts of 3% caustic soda solution at 25 degrees C. and dried, is obtained in the form of a white powder melting at 211–213 degrees C.

While the 1-mercaptobenzothiazoles have been described in detail herein, it is to be understood that any other mercaptazole may be employed in the practice of the invention, examples being 5-chlor 1-mercaptobenzothiazole, 4-nitro 1-mercaptobenzothiazole, 5-nitro 1-mercaptobenzothiazole, 4-chlor 5-nitro 1-mercaptobenzothiazole, 3-phenyl 1-mercaptobenzothiazole, 3-methyl 1-mercaptobenzothiazole, 5-ethoxy 1-mercaptobenzothiazole, 5-methoxy 1-mercaptobenzothiazole, 1-mercapto benzoxazole, 1-mercapto tolyl thiazoles, 1-mercapto benzimidazole, dimethyl 1-mercaptobenzothiazoles, 3-phenyl 5-mercapto 1-2-4-thiodiazole, 1-mercapto naphthothiazoles, 3-p-tolyl 5-mercapto 1-2-4-thiodiazole and 5-mercapto 1-3-4-thiodiazoles. Any of these mercaptazoles may be reacted with formaldehyde and an ammonium sulphide according to the different variations of procedure described in the preceding examples.

The reaction products to which the invention relates may be employed as accelerators of vulcanization in substantially any of the ordinary rubber formulae, one found particularly satisfactory being the following:

| | Parts by weight |
|---|---|
| Extracted pale crepe rubber | 100 |
| Zinc oxide | 5 |
| Sulphur | 3 |
| Stearic acid | 1.5 |
| Accelerator | 0.5 |

After vulcanization, physical tests conducted on stocks so made up will give results of the order of the following:

| Cure in mins. at °F. | Ult. tens. kgs/cm² | Max. elong. in percent | Modulus in kgs./cm² | |
|---|---|---|---|---|
| | | | 500% | 700% |
| Reaction product of penta methylene diamino disulphide and 1-mercaptobenzothiazole (Example 1) | | | | |
| 20/260 | 22 | 885 | 4 | 10 |
| 40 | 77 | 910 | 10 | 24 |
| 60 | 98 | 880 | 12 | 34 |
| 80 | 106 | 830 | 16 | 48 |
| Reaction product of formaldehyde, ammonium hydrogen sulphide and ammonium benzothiazyl mercaptide (Example 4) | | | | |
| 10/260 | 10 | 890 | 4 | 6 |
| 20 | 43 | 860 | 9 | 20 |
| 30 | 73 | 865 | 12 | 30 |
| 40 | 87 | 835 | 13 | 38 |
| 60 | 96 | 790 | 18 | 56 |
| Reaction product of formaldehyde, ammonium hydrogen sulphide and benzothiazyl methylene hydrin (Example 5) | | | | |
| 20/260 | 34 | 930 | 6 | 11 |
| 40 | 60 | 815 | 11 | 31 |
| 60 | 100 | 830 | 16 | 47 |
| 80 | 96 | 775 | 19 | 58 |
| Reaction product of formaldehyde, ammonium sulphide and 1-mercaptobenzothiazole (Example 6) | | | | |
| 20/260 | 81 | 940 | 9 | 22 |
| 40 | 111 | 850 | 14 | 47 |
| 60 | 119 | 810 | 19 | 62 |
| 80 | 137 | 800 | 23 | 77 |
| Reaction product of penta methylene diamino disulphide and 4-chlor 1-mercaptobenzothiazole (Example 7) | | | | |
| 20/260 | 16 | 850 | 5 | 9 |
| 30 | 59 | 950 | 8 | 16 |
| 40 | 80 | 920 | 11 | 23 |
| 60 | 90 | 900 | 12 | 28 |
| 80 | 120 | 900 | 14 | 38 |

These products thus possess valuable properties as accelerators of vulcanization. As disclosed in the preceding data, they may be employed as accelerators of the vulcanization of rubber either by themselves or in conjunction with other accelerators such as diphenylguanidine, diphenylguanidine oxalate, diortho tolyl guanidine, diphenylguanidine neutral succinate and cyclohexyl ethylene diamine. These products and the process of their preparation are claimed in copending application Serial No. 734,230, filed July 7, 1934.

It is intended that the patent shall cover, by suitable expression in the appended claims, whatever features of patentable novelty reside in the invention.

What I claim is:

1. A process of accelerating the vulcanization of rubber that comprises vulcanizing in the presence of the reaction product of 1-mercaptobenzothiazole and pentamethylene diamino disulphide.

2. A process of accelerating the vulcanization of rubber that comprises vulcanizing in the presence of the reaction product of a mercaptobenzothiazole and pentamethylene diamino disulphide.

3. A process of accelerating the vulcanization of rubber that comprises vulcanizing in the presence of the reaction product of a 1-mercapto aryl thiazole and pentamethylene diamino disulphide.

4. A process of accelerating the vulcanization of rubber that comprises vulcanizing in the presence of the reaction product of a 1-mercapto aryl azole and pentamethylene diamino disulphide.

5. A process of accelerating the vulcanization of rubber that comprises vulcanizing in the presence of the reaction product of a 1-mercapto azole and pentamethylene diamino disulphide.

6. A process of accelerating the vulcanization of rubber that comprises vulcanizing in the presence of the reaction product of a 1-mercaptobenzothiazole, formaldehyde and ammonium hydrogen sulphide.

7. A process of accelerating the vulcanization of rubber that comprises vulcanizing in the presence of the reaction product of a 1-mercaptobenzothiazole, formaldehyde and ammonium hydrogen sulphide, said materials having been reacted in the proportion of one mol of thiazole, five mols of aldehyde and two mols of ammonium sulphide.

8. A process of accelerating the vulcanization of rubber that comprises vulcanizing in the presence of the reaction product of a 1-mercaptobenzothiazole, formaldehyde and ammonium sulphide.

9. A process of accelerating the vulcanization of rubber that comprises vulcanizing in the presence of the reaction product of a 1-mercapto aryl thiazole, formaldehyde and ammonium sulphide.

10. A process of accelerating the vulcanization of rubber that comprises vulcanizing in the presence of the reaction product of a mercaptoazole, formaldehyde and ammonium sulphide.

11. A process of accelerating the vulcanization of rubber that comprises vulcanizing in the presence of the reaction product of a 1-mercaptobenzothiazole, formaldehyde and ammonium sulphide.

12. A rubber product that has been vulcanized in the presence of the reaction product of 1-mercaptobenzothiazole and pentamethylene diamino disulphide.

13. A rubber product that has been vulcanized in the presence of the reaction product of a mercaptobenzothiazole and pentamethylene diamino disulphide.

14. A rubber product that has been vulcanized in the presence of the reaction product of a 1-mercapto aryl thiazole and pentamethylene diamino disulphide.

15. A rubber product that has been vulcanized in the presence of the reaction product of a 1-mercapto azole and pentamethylene diamino disulphide.

16. A rubber product that has been vulcanized in the presence of the reaction product of a 1-mercaptobenzothiazole, formaldehyde and ammonium hydrogen sulphide.

17. A rubber product that has been vulcanized in the presence of the reaction product of a 1-mercaptobenzothiazole, formaldehyde and ammonium hydrogen sulphide, said materials having been reacted in the proportion of one mol of thiazole, five mols of aldehyde and two mols of ammonium sulphide.

18. A rubber product that has been vulcanized in the presence of the reaction product of a 1-mercapto aryl thiazole, formaldehyde and ammonium sulphide.

19. A rubber product that has been vulcanized in the presence of the reaction product of a 1-mercaptazole, formaldehyde and ammonium sulphide.

20. A process of accelerating the vulcanization of rubber which comprises vulcanizing rubber in the presence of a mercaptobenzothiazole derivative which melts at 223–224° C. and which is prepared from mercaptobenzothiazole, formaldehyde and ammonium hydrogen sulphide.

21. A process of accelerating the vulcanization of rubber which comprises vulcanizing rubber in the presence of a mercaptobenzothiazole derivative which is prepared from mercaptobenzothiazole, formaldehyde, and ammonium sulphide.

22. A process of accelerating the vulcanization of rubber which comprises vulcanizing rubber in the presence of a mercaptothiazole derivative which is prepared from a mercaptothiazole, formaldehyde and ammonium sulphide.

23. A process of accelerating the vulcanization of rubber which comprises vulcanizing rubber in the presence of a mercaptazole derivative which is prepared from a mercaptazole, formaldehyde and ammonium sulphide.

JAN TEPPEMA.